United States Patent [19]
Yuan et al.

[11] Patent Number: 5,644,013
[45] Date of Patent: Jul. 1, 1997

[54] FLUORESCENT ORGANOSILICON POLYMERS

[75] Inventors: Chien-Hua Yuan; Robert C. West, both of Madison, Wis.

[73] Assignee: Wisconsin Alumni Research Foundation, Madison, Wis.

[21] Appl. No.: 292,593

[22] Filed: Aug. 18, 1994

[51] Int. Cl.$^6$ ............................................. C08G 77/06
[52] U.S. Cl. ............................... 528/15; 528/25; 528/27; 526/279
[58] Field of Search .............................. 528/27, 25, 15; 526/279

[56] References Cited

U.S. PATENT DOCUMENTS 5,243,060  9/1993  Barton et al. ........................... 556/435

OTHER PUBLICATIONS

S. Hu, et al., "Synthesis and photodegradation of poly[2,5-bis(dimethylsilyl)thiophene]", 21 *Poly. Bull.* 133–140 (1989).

K. Nate, et al., "Photolysis of Polymeric Organosilicon Systems. 4. Photochemical Behavoir of Poly[p-(disilanylene)phenylene]", 6 *Organometallics* 1673–1679 (1987).

J. Ohshita, et al., "Polymeric Organosilicon Systems. 10. Synthesis and Conducting Properties of Poly[2,5-(disilanylene)thienylenes]", 24 *Macromolecules* 2106–2107 (1991).

R. Corriu, et al., "Organosilicon Polymers: Synthesis of Poly[(silanylene)diethynylene]s with Conducting Properties", 2 *Chem. Mater.* 351–352 (1990).

R. Corriu, et al., "Preparation of diphenylsilylene . . . ", 455 *J. Organometallic Chem.* 69–76 (1993).

R. Corriu, et al., "Organosilicon Polymers: Pyrolysis Chemistry of Poly[(dimethylsilylene)diacetylene]", 11 *Organometallics* 2507–2513 (1992).

H. Wu, et al., "Preparation of Poly(dichlorosilaethylene) and Poly(silaethylene) via Ring-Opening Polymerization", 25 *Macromolecules* 1840–1841 (1992).

L. Harrah, et al., "Electronic Spectra . . . Polysilylenes", 20 *Macromolecules* 2037–2039 (1987).

H. Shizuka, et al., "Fluorescence . . . Aromatic Silanes", *J. Chem. Soc. Chem. Comm.* 405–406 (1981).

H. Shizuka, et al., "The 2pπ*-3dπ Interaction in Aromatic Silanes", 80 *J. Chem. Soc., Faraday Trans.* 1 341–357 (1984).

L. Harrah, et al., "Electronic Spector of Polysilanes", 20 *Macromolecules* 601–608 (1987).

M. Moroni, et al., "Rigid Rod Conjugated Polymers . . . ", 27 *Macromolecules* 562–571 (1994).

D. Clery, "After Years in the Dark . . . ", 263 *Science* 1700–1702 (1994).

J. Ziegler, et al., "Flat Panel Display Technology", *Electrochem. Soc. Interface* 27–32 (Summer 1994).

D. Bradley, "Molecular electronics–aspects of the physics", *Chemistry in Great Britain* 719–723 (Aug. 1991).

G. Gustafsson, et al., "Flexible light–emitting diodes . . . ", 357 *Nature* 477–479 (1992).

P. Yocom, "Full Color EL Displays", *Electrochem. Soc. Interface* 36–38 (Summer 1994).

T. Iwahara, et al., "Synthesis . . . Ethynylene–Disilanylene Copolymers", 23 *Macromolecules* 1298–1301 (1990).

(List continued on next page.)

*Primary Examiner*—Karen A. Dean
*Attorney, Agent, or Firm*—Quarles & Brady

[57] ABSTRACT

A fluorescent polymer having the moiety

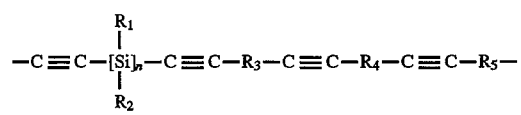

is disclosed. $R_1$ and $R_2$ are $H_1$ alkyl, or aromatic. $R_3$, $R_4$, and $R_5$ are aromatic. A preferred fluorescent composition may be formed by combining the fluorescent polymer with a second polymer, such as polystyrene or polysilystyrene.

2 Claims, 2 Drawing Sheets x+y=1
1a: $R_3, R_5$ = BENZENE, x/y=1
1b: $R_3, R_5$ = BENZENE, x/y=3
1c: $R_3, R_5$ = THIOPHENE, x/y=1

OTHER PUBLICATIONS

A. Hay, "Preparation of m–and p–Diethynylbenzenes", 25 *J. Org. Chem.* 637–638 (1960).

L. Cassar, "Synthesis Aryl–and Vinyl–Substituted Acetylene . . . ", 93 *J. Organometall. Chem.* 253–257 (1975).

H. Dieck, et al., "Palladium Catalyzed Synthesis . . . ", 93 *J. Organometall. Chem.* 259–263 (1975).

R. Corriu, et al., "Synthesis of Poly(alkynylsilanes) having . . . Backbone", 28 *J. Poly. Sci.: Part C: Poly. Lett.* 431–437 (1990).

Wildeman, et al., "Synthesis of Poly[(silanylene) thiophene]s", 1 *J. Inorg. & Organometall. Poly.* 567–580 (1991).

FLUORESCENT ORGANOSILICON POLYMERS

This invention was made with United States Government supported awarded by the following agencies: the Department of Defense (Air Force), Grant No. AFOSR-89-0004; the Department of Defense (Navy), Grant No. N00014-92-J-1443; and the National Science Foundation, Grant Nos. CHE-8922737, CHE-9300499, INT-9207482, and INT-9201660. The United States Government has certain rights in this invention.

BACKGROUND OF THE INVENTION

1. Field Of The Invention

This invention relates generally to fluorescent polymers. More particularly, it relates to fluorescent polymers containing polysilane and diethynylaryl units.

2. Background Of The Art

Certain organosilicon polymers are known to display a variety of intriguing properties such as photosensitivity (S. Hu, et al. 21 *Polymer Bulletin* 133–140 (1989) and K. Nate, et al., 6 *Organometallics* 1673–1679 (1987)), fluorescence, conductivity (J. Ohshita, et al., 24 *Macromolecules* 2106–2107 (1991) and R. Corriu, et al., 2 *Chem. Mater.* 351–352 (1990)), and non-linear optical properties (R. Corriu, et al., 455 *J. Organometallic Chem.* 69–76 (1993).

In addition these polymers have been used as precursors to silicon carbide ceramics (R. Corriu, et al., 11 *Organometallics* 2507–2513 (1992) and H. Wu, et al., 25 *Macromolecules* 1840–1841 (1992)). The disclosure of all the above articles, and of all other articles and patents recited herein, are incorporated by reference as if fully set forth herein.

Fluorescence is often described in terms of how electronic orbitals are affected. See L. Harrah, et al., 20 *Macromolecules* 601–608 (1987); H. Shizuka, et al., 80 *J. Chem. Soc. Faraday Trans.* 1 341–357 (1984); H. Shizuka, et al., *J. Chem. Soc. Chem. Comm.* 405–406 (1981); L. Harrah, et al., 20 *Macromolecules* 2037–2039 (1987); and M. Moroni, et al., 27 *Macromolecules* 562–571 (1994). However, much remains unknown regarding what causes and affects fluorescence in organosilicon compounds.

As a result, a need exists for low cost organosilicon polymers which have a strong fluorescence in the visible light region when exposed to ultraviolet (UV) light. Such a polymer could be useful in display systems, radiation detection systems, semi-conducting devices, and perhaps be useful in lasers. It is especially desirable to have a class of such polymers where the color of the fluoresced light can readily be modified.

SUMMARY OF THE INVENTION

We have discovered a new class of fluorescent polymers having an intense visible fluorescence when exposed to ultraviolet light. These polymers, surprisingly, can be mixed with other polymers such as polystyrene or polysilastyrene to make useful and economical compositions.

In one aspect, the invention provides a polymer having the following moiety:

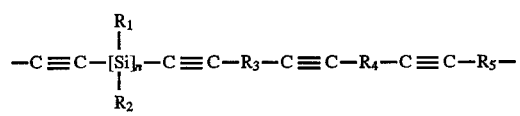

wherein n is 1–10; $R_1$ and $R_2$ are independently selected from the group consisting of H, alkyl moieties having less than 16 carbons, and aromatic moieties having 1–3 rings, wherein $R_1$ is independently selected from the group for each n (and thus may be different for each n) if n>1, and wherein $R_2$ is independently selected from the group for each n if n>1; and wherein $R_3$, $R_4$, and $R_5$ are independently selected from the group consisting of aromatic moieties having 1–3 rings.

The —$R_3$—, —$R_4$—, and —$R_5$— aromatic moieties are preferably:

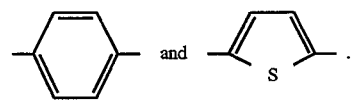

The preferred alkyl moieties are methyl, ethyl, propyl, and butyl groups.

The fluorescent polymers are useful for the detection of radiation. For example, a panel coated with the polymer material would exhibit a unique color in the presence of UV radiation.

These polymers may also have the potential for being useful for displays (to replace neon signs). By using the appropriate substituents for $R_1$ through $R_5$, the polymer's fluorescence may be varied to produce various colors of visible light.

For examples of various utilities for fluorescent polymers in general see P. Yocom, *Electrochem. Soc. Interface* 36–38 (Summer 1994); G. Gustafsson, et al., 357 *Nature* 477–479 (1992); D. Bradley, *Chemistry in Great Britain* 719–723 (1991); J. Ziegler, et al., *Electrochem. Soc. Interface* 27–32 (Summer 1994); and D. Clery, 263 *Science* 1700–1702 (1994).

Another aspect of the invention provides a fluorescent composition comprising the above polymer and an inexpensive plastic such as polystyrene or polysilastyrene. This composition is possible since the above polymer is surprisingly miscible with a plastic such as polystyrene or polysilastyrene. This is unexpected since polymers often do not mix well. The ability to mix the new polymer with a very inexpensive polymer such as polystyrene or polysilastyrene makes the fluorescent composition even cheaper.

A further aspect of the invention includes a process for making such a fluorescent composition by mixing a fluorescent polymer as described above that has a first fluorescent color in the visible light spectrum with a second polymer in an organic solvent that both polymers are soluble in; and then evaporating at least part of the solvent. The fluorescent composition is formed and preferably has a second fluorescent color in the visible light range.

The objects of the invention, therefore, include providing fluorescent polymers and compositions of the above kind:

(a) which display fluorescence in the visible light range when exposed to UV light;

(b) which can be synthesized efficiently and at relatively low cost;

(c) which have good fluorescent light yield and intensity; and (d) which are capable of mixing with inexpensive polymers.

These and still other objects and advantages of the present invention will be apparent from the description below. However, this description is only of the preferred embodiments. The claims should, therefore, be looked to in order to assess the whole scope of the invention.

DETAILED DESCRIPTION OF THE INVENTION

Figure 1:
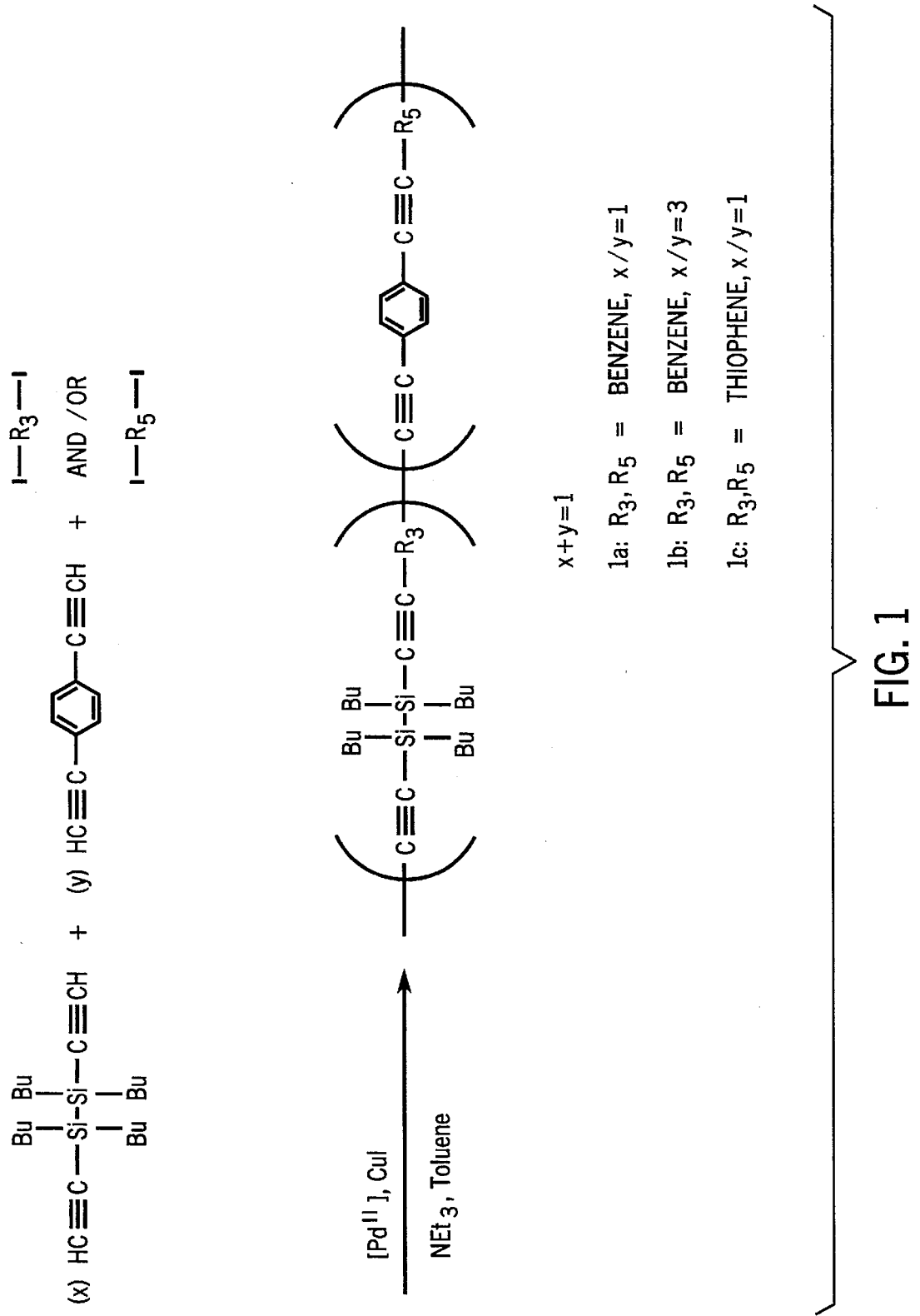
FIG. 1 is a schematic of the synthesis of three fluorescent polymers of the present invention.

Precursor "x" of FIG. 1 can be made by various known methods. See e.g., T. Iwahara, 23 *Macromolecules* 1298–1301 (1990).

Precursor "y" of FIG. 1, the monomer 1,4-diethynylbenzene, was synthesized via the debromination of 1,4 bis(1,2-dibromoethyl)benzene as has been detailed previously. See e.g., A. Hay, 25 *J. Organometallic Chem.* 637–638 (1960)).

The 1,4-diiodothiophene and p-diiodobenzene shown in FIG. 1 were purchased from Aldrich Chemical Co. and TCI America Chemical Co., respectively.

For other polymer variants within the claims, the starting compounds would be correspondingly purchased or synthesized using standard techniques. In this regard, techniques for changing the number of silicons in "x" or the silicon substituents are well known, as are techniques for changing the $R_4$ group in "y".

Various polymerization techniques have been reported for other compounds. See, generally, J. Wildeman, et al., 1 *J. Inorg. & Organometall. Poly.* 567–580 (1991); T. Barton, et al., U.S. Pat. 5,243,060; R. Corriu, et al., 28 *J. Poly. Science: Part C: Poly. Lett.* 431–437 (1990); H. Dieck, et al., 93 *J. Organometall. Chem.* 259–263 (1975); and L. Cassar, 93 *J. Organometall. Chem.* 253–257 (1975). We modified these techniques to render them suitable for our starting materials.

EXAMPLE 1 (Compound 1a)

A mixture of 1,2-diethynyl-1,1,2,2-tetrabutyldisilane (0.67 g, 2 mmol), 1,4-diiodobenzene (1.32 g, 4 mmol), 1,4-diethynylbenzene (0.25 g, 2 mmol), CuI (0.04 mmol, 7.6 mg), and $(PPh_3)_2PdCl_2$ (0.004 mmol, 2.8 mg) were dissolved together in 30 ml of toluene. After addition of ca 5 ml of $NEt_3$, the reaction mixture was stirred for 10 h at ambient temperature, then refluxed for 12 h. Quantitative precipitation of $Et_3NHCl$ salt was observed during the reaction. After cooling the reaction mixture, the precipitates were removed by passing through a short silica gel column. The solvent was pumped off and 50 ml of THF was added to dissolve the residue, which was filtered again. The resulting filtrate was added to excess methanol with stirring to precipitate the polymer. The precipitate was dried under vacuum for 48 h and gave compound 1a (0.99 g, 81%). The molar ratio of disilane to diethynylbenzene was 1:1. The visible color of the compound 1a under UV light was green-yellow. The NMR spectra was consistent with the formula.

EXAMPLE 2 (Compound 1b)

A mixture of 1,2-diethynyl-1,1,2,2-tetrabutyldisilane (1.005 g, 3 mmol), 1,4-diiodobenzene (1.32 g, 4 mmol), 1,4-diethynylbenzene (0.125 g, 1 mmol), CuI (0.04 mmol, 7.6 mg), and $(PPh_3)_2PdCl_2$ (0.004 mmol, 2.8 mg) were dissolved together in 30 ml of toluene. After addition of ca 5 ml of $NEt_3$, the reaction mixture was stirred for 10 h at ambient temperature, then refluxed for 12 h. Quantitative precipitation of $Et_3NHCl$ salt was observed during the reaction. After cooling the reaction mixture, the precipitates were removed by passing through a short silica gel column. The solvent was pumped off and 50 ml of THF was added to dissolve the residue, which was filtered again. The resulting filtrate was added to excess methanol with stirring to precipitate the polymer. The precipitate was dried under vacuum for 48 h and gave compound 1b (1.12 g, 78%). The ratio of disilane to diethynylbenzene was 3:1. The visible color of the compound 1b under UV light was green. The NMR spectra was consistent with the formula.

EXAMPLE 3 (Compound 1c)

A mixture of 1,2-diethynyl-1,1,2,2-tetrabutyldisilane (0.67 g, 2 mmol), 1,4-diiodothiophene (1.34 g, 4 mmol), 1,4-diethynylbenzene (0.25 g, 2 mmol), CuI (0.04 mmol, 7.6 mg), and $(PPh_3)_2PdCl_2$ (0.004 mmol, 2.8 mg) were dissolved together in 30 ml of toluene. After addition of ca 5 ml of $NEt_3$, the reaction mixture was stirred for 10 h at ambient temperature, then refluxed for 12 h. Quantitative precipitation of $Et_3NHCl$ salt was observed during the reaction. After cooling the reaction mixture, the precipitates were removed by passing through a short silica gel column. The solvent was pumped off and 50 ml of THF was added to dissolve the residue, which was filtered again. The resulting filtrate was added to excess methanol with stirring to precipitate the polymer. The precipitate was dried under vacuum for 48 h and gave compound 1c (0.84 g, 68%). The molar ratio of disilane to diethynylbenzene was 1:1. The visible color of the compound 1c under UV light was orange. The NMR spectra was consistent with the formula.

EXAMPLE 4

A 1% (by weight) polymer blend was prepared by dissolving the fluorescent polymer, e.g. compound 1a (0.005 g), and polystyrene (0.495 g) together in 30 ml of toluene. The resulting solution was subsequently poured into 300 ml ethanol with stirring, and a pale yellow solid precipitated. The solid was evacuated at 40° C. for 48 h and gave the polymer blend (0.5 g).

The visible color of the fluorescent polymer blend under UV light was green-yellow before mixing with polystyrene, and blue after.

A 1% (by weight) polymer blend using compound 1a and polysilastyrene was prepared using exactly the same method as above. The fluorescent behavior is also the same as above.

Further, other fluorescent polymer blends can be made by combining the fluorescent polymers of the present invention with any inexpensive blending polymer as long as an organic solvent is used that is capable of dissolving both polymers.

Thus, reaction of diethynylbenzene with $HC\equiv C(SiBu_2)_2C\equiv CH$ and p-diiodobenzene generated copolymers 1a and 1b. Reaction of diethynylbenzene with $HC\equiv C(SiBu_2)_2C\equiv CH$ and p-diiodothiophene generated copolymer 1c.

Figure 2:
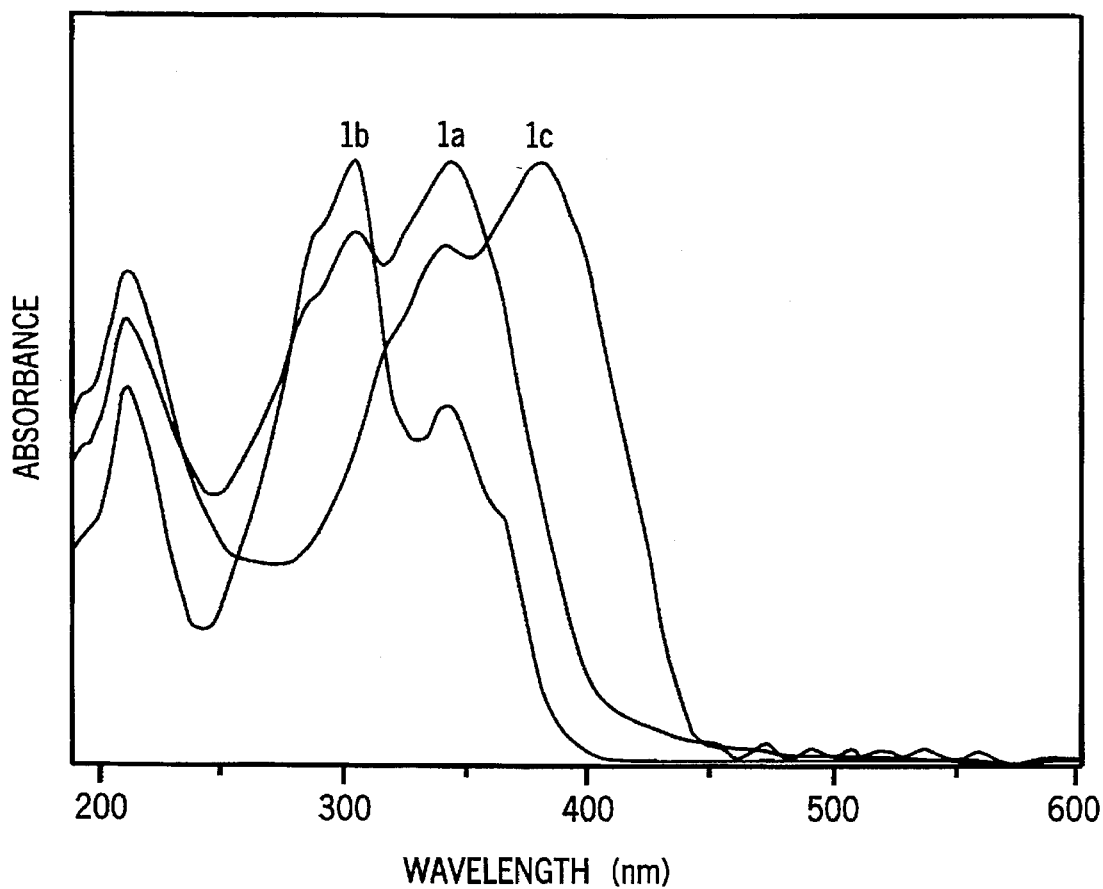
FIG. 2 shows the UV spectra of polymers 1a, 1b, and 1c.

The UV spectra of polymers 1a and 1b exhibit primary bands at 311 and 346 respectively (FIG. 2). In polymer 1c, a thiophene ring is present in place of the benzene unit ($R_3$ and $R_5$ positions) in polymers 1a and 1b. The electronic absorption of polymer 1c, which contains thiophene rings, shows a red-shifted pattern (see FIG. 2). It is clear that the electronic structure of these organosilicon polymers is strongly dependent on the aromatic moieties. Also, the monomer ratio of x:y changes the color (compare 1a with 1b in FIG. 2).

From the conductivity data shown in Table 1 below, the iodine-doped polymer films of each compound are in the semi-conductive range of $10^{-4}$ S cm$^{-1}$.

TABLE 1

| Polymer | Conductivity (S/cm) | Film Thickness (μm) |
|---|---|---|
| 1a | $1.0 \times 10^{-4}$ | 1.0 |
| 1c | $5.3 \times 10^{-4}$ | 0.2 |

Thus, it can be seen that the present invention provides fluorescent organosilicon polymers. For example, polymers may be designed to attain many fluorescent colors and intensities by changing the number of conjugated silanes; changing the interposed aromatic groups ($R_3$ through $R_5$); and varying the "x" and "y" monomer ratios. More particularly, diethynyl monomers having any of 1–10 silicons may be copolymerized with diethynyl-benzene, -thiophene, -anthracene, etc. and diiodo-benzene, -thiophene, -anthracene, etc. using reaction conditions analogous to Examples 1, 2, and 3. Also, a mixture of diiodo-benzene, -thiophene, -anthracene, etc. may be employed so that a different group occurs at $R_3$ and $R_5$. The claims should therefore be looked to in order to assess the full scope of the invention.

We claim:

1. A fluorescent polymer having the following moiety:

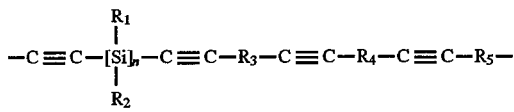

wherein:
(a) n=1–10;
(b) $R_1$ and $R_2$ are independently selected from a first group consisting of H, alkyl moieties having less than 16 carbons, and aromatic moieties having 1–3 rings, wherein if n>1 $R_1$ is independently selected from said first group for each n, and wherein if n>1 $R_2$ is independently selected from said first group for each n; and
(c) $R_3$, $R_4$, and $R_5$ are independently selected from a second group consisting of aromatic moieties having 1–3 rings.

2. The polymer of claim 1, wherein —$R_3$—, —$R_4$—, and —$R_5$— are independently selected from the group consisting of:

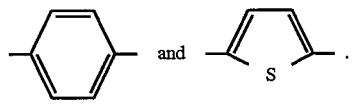

* * * * *